(12) United States Patent
Lu

(10) Patent No.: US 6,677,027 B1
(45) Date of Patent: Jan. 13, 2004

(54) VEHICLE MAT

(75) Inventor: Michael Lu, Tainan Hsien (TW)

(73) Assignee: Packy Poda Inc., Tainan Hsien (TW)

( * ) Notice: Subject to any disclaimer, the term of this patent is extended or adjusted under 35 U.S.C. 154(b) by 8 days.

(21) Appl. No.: 10/195,016

(22) Filed: Jul. 9, 2002

(51) Int. Cl.⁷ .................................................. B32B 3/10
(52) U.S. Cl. ......................... 428/138; 428/99; 428/120; 296/97.23; 15/215
(58) Field of Search ........................ 428/99, 120, 138; 296/97.23; 15/215

(56) References Cited

U.S. PATENT DOCUMENTS 4,829,627 A * 5/1989 Altus et al. .............. 296/97.23

* cited by examiner

Primary Examiner—Alexander S. Thomas
(74) Attorney, Agent, or Firm—Alan D. Kamrath; Rider Bennett, LLP

(57) ABSTRACT

A vehicle mat has a main plate and a treading plate disposed on the main plate. The main plate has a recessed chamber to receive the treading plate, a plurality of protrusions, a plurality of crossed channels, and a plurality of fastening posts. The treading plate has a plurality of crossed lattices, a plurality of holes defined by the crossed lattices, a plurality of dirt scrape blocks disposed on the crossed lattices, and a plurality of fastening blocks matching the fastening posts. Each fastening post is inserted in the corresponding hole of the treading plate. Each fastening block engages with an annular groove of the corresponding fastening post.

2 Claims, 5 Drawing Sheets

VEHICLE MAT

BACKGROUND OF THE INVENTION

The present invention relates to a vehicle mat. More particularly, the present invention relates to a vehicle mat which can scrape dirt on a pair of shoes.

Referring to FIG. 5, a conventional vehicle mat 9 has a recessed chamber 91, a plurality of protrusions 92, and a plurality of channels 93. Dirt on a pair of shoes will remain on the channels 93, and the protrusions 92 cannot scrape dirt on the pair of shoes effectively.

SUMMARY OF THE INVENTION

An object of the present invention is to provide a vehicle mat which can scrape dirt on a pair of shoes effectively.

Another object of the present invention is to provide a vehicle mat which has a treading plate disposed on a main plate stably.

Accordingly, a vehicle mat comprises a main plate and a treading plate disposed on the main plate. The main plate has a recessed chamber to receive the treading plate, a plurality of protrusions, a plurality of crossed channels, and a plurality of fastening posts disposed on crossroads among the crossed channels. Each of the fastening posts has an annular groove. The treading plate has a plurality of crossed lattices, a plurality of holes defined by the crossed lattices, a plurality of dirt scrape blocks disposed on the crossed lattices, and a plurality of fastening blocks matching the fastening posts. Each of the fastening posts is inserted in the corresponding hole of the treading plate. Each of the fastening blocks engages with the annular groove of the corresponding fastening post.

DETAILED DESCRIPTION OF THE INVENTION

Figure 1:
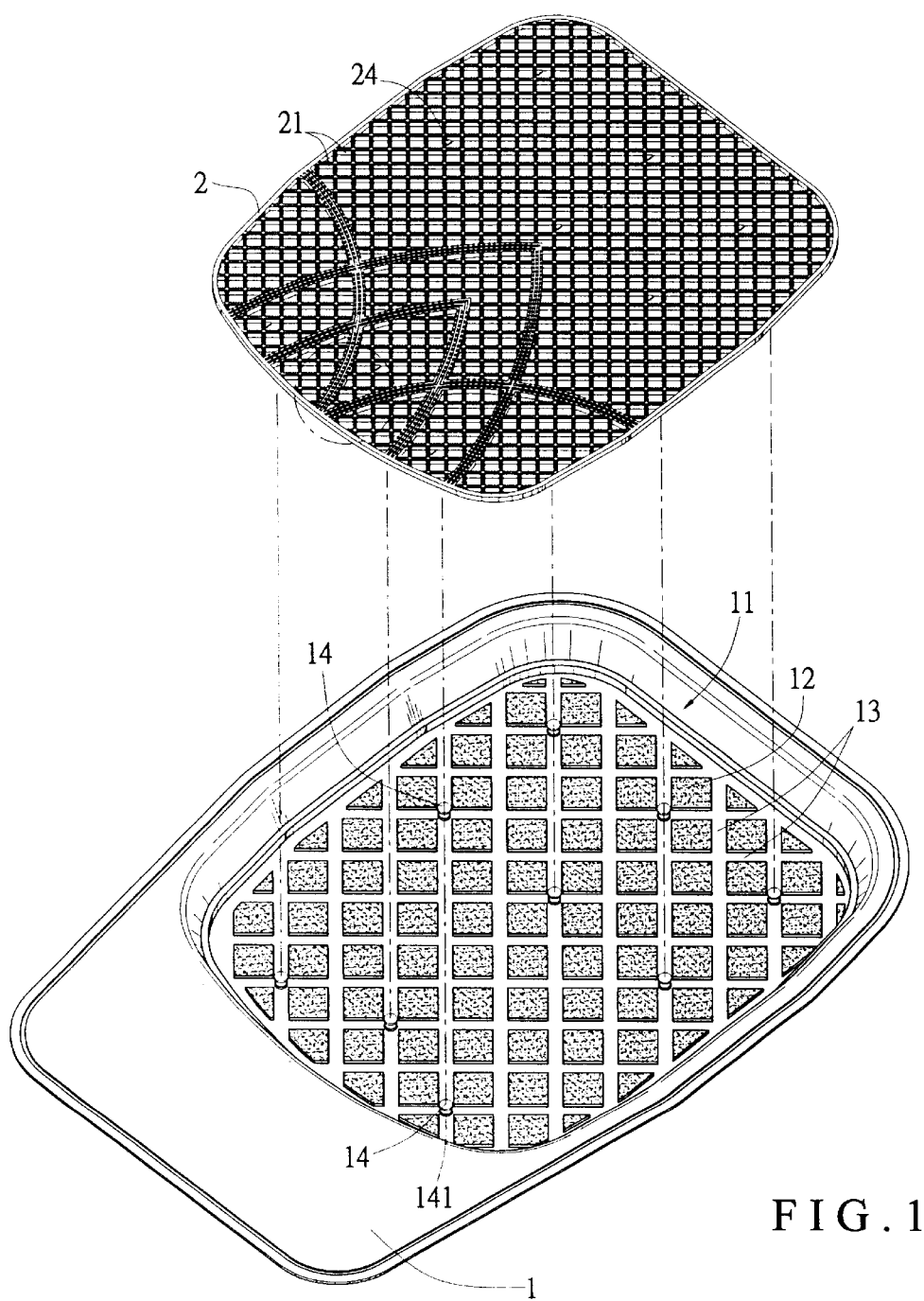
FIG. 1 is a perspective exploded view of a vehicle mat of a preferred embodiment in accordance with the present invention.
Figure 2:
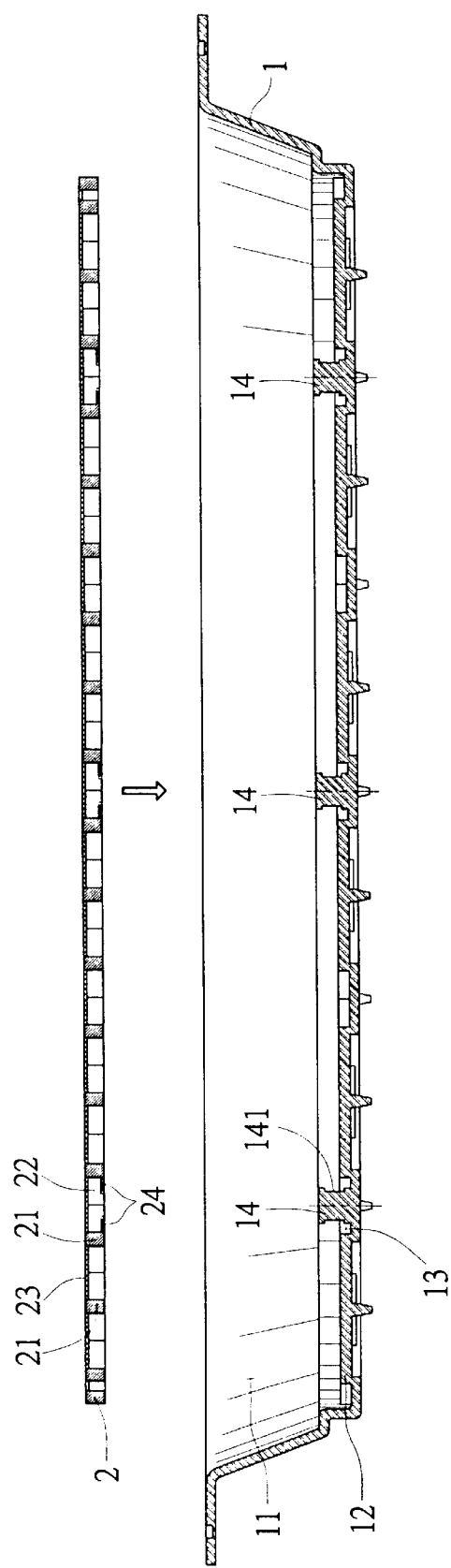
FIG. 2 is a sectional exploded view of a vehicle mat of a preferred embodiment in accordance with the present invention.
Figure 3:
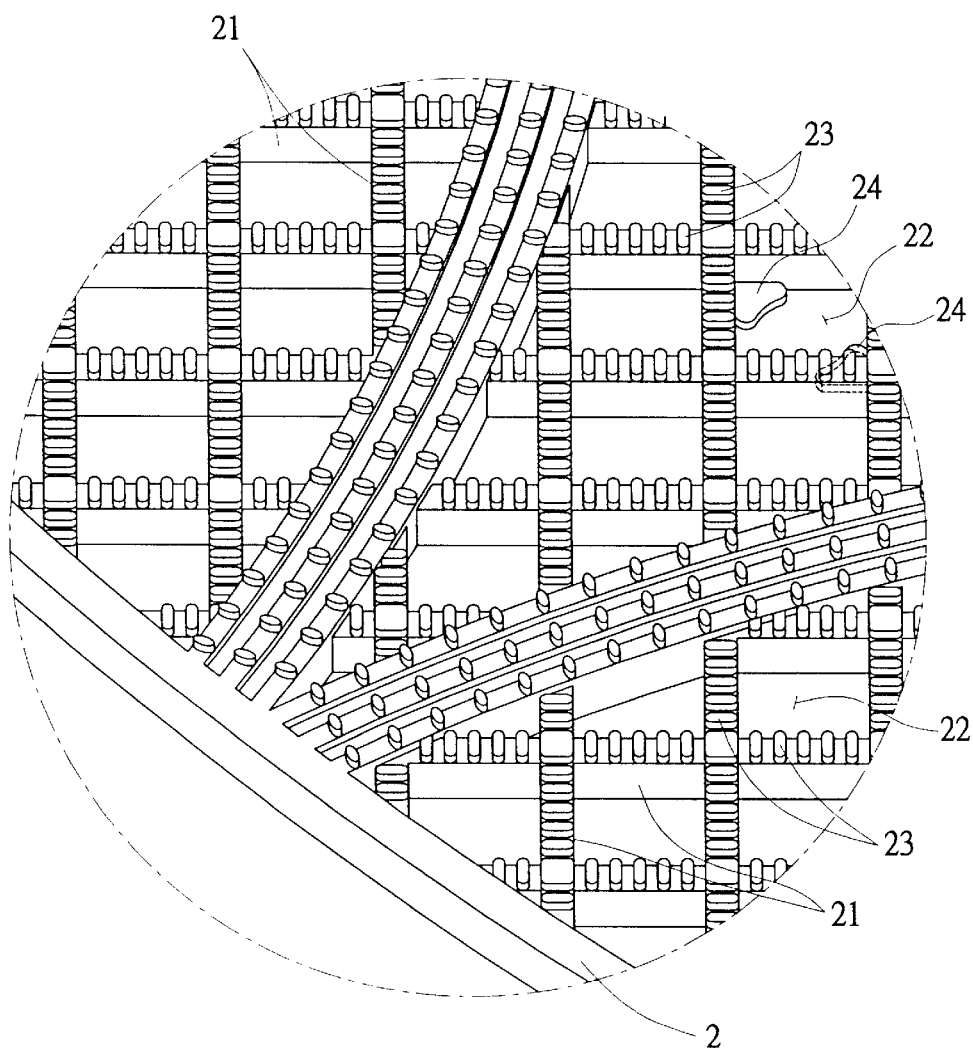
FIG. 3 is a partially perspective enlarged view of a treading plate of a preferred embodiment in accordance with the present invention.
Figure 4:
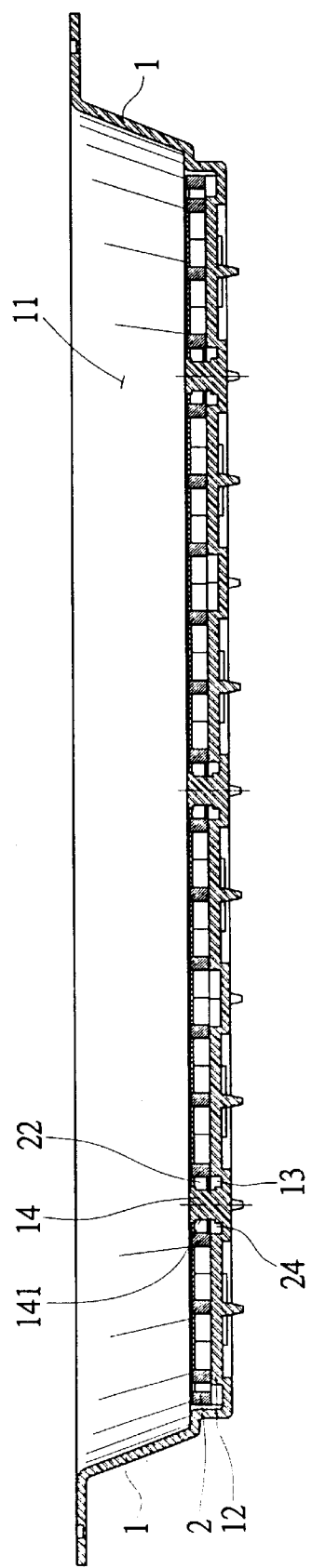
FIG. 4 is a sectional assembly view of a vehicle mat of a preferred embodiment in accordance with the present invention.
Figure 5:
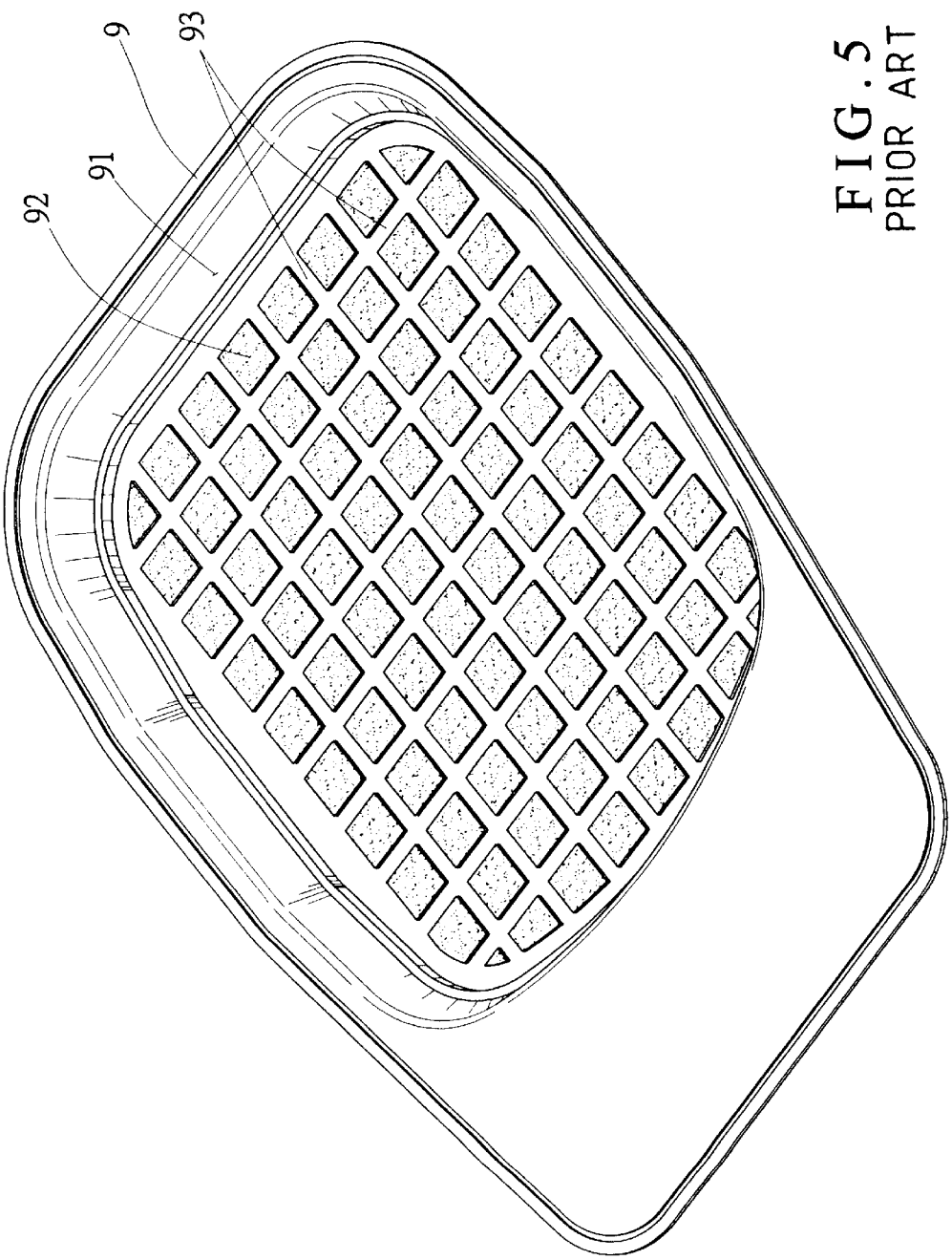
FIG. 5 is a perspective view of a conventional vehicle mat of the prior art.

Referring to FIGS. 1 to 4, a vehicle mat comprises a main plate 1, and a treading plate 2 disposed on the main plate 1.

The main plate 1 has a recessed chamber 11 to receive the treading plate 2, a plurality of protrusions 12, a plurality of crossed channels 13, and a plurality of fastening posts 14 disposed on crossroads among the crossed-channels 13.

Each of the fastening posts 14 has an annular groove 141.

The treading plate 2 has a plurality of crossed lattices 21, a plurality of holes 22 defined by the crossed lattices 21, a plurality of dirt scrape blocks 23 disposed on the crossed lattices 21, and a plurality of fastening blocks 24 matching the fastening posts 14.

Each of the fastening posts 14 is inserted in the corresponding hole 22 of the treading plate 2.

Each of the fastening blocks 24 engages with the annular groove 141 of the corresponding fastening post 14.

When a user treads the treading plate 2, dirt on a pair of shoes of the user can be scraped out by the dirt scrape blocks 23 effectively.

The dirt enters the crossed channels 13 through the holes 22 of the treading plate 2.

The present invention has the following advantages. Dirt on a pair of shoes of the user can be scraped out by the dirt scrape blocks effectively. The dirt enters the crossed channels through the holes of the treading plate so that the dirt is covered by the treading plate. Each of the fastening blocks engages with the annular groove of the corresponding fastening post so that the recessed chamber receives the treading plate stably.

The invention is not limited to the above embodiment but various modification thereof may be made. Further, various changes in form and detail may be made without departing from the scope of the invention.

I claim:

1. A vehicle mat comprises:

a main plate and a treading plate disposed on the main plate, the main plate having a recessed chamber to receive the treading plate, a plurality of protrusions, a plurality of crossed channels, and a plurality of fastening posts disposed on crossroads among the crossed channels, each of the fastening posts having an annular groove, the treading plate having a plurality of crossed lattices, a plurality of holes defined by the crossed lattices, a plurality of dirt scrape blocks disposed on the crossed lattices, and a plurality of fastening blocks matching the fastening posts, each of the fastening posts inserted in the corresponding hole of the treading plate, and each of the fastening blocks engaging with the annular groove of the corresponding fastening post.

2. The vehicle mat as claimed in claim 1, wherein a shape of each of the lattices is varied.

* * * * *